No. 702,494. Patented June 17, 1902.
G. R. SHERWOOD.
STAMP CANCELING MACHINE.
(Application filed July 24, 1900.)
(No Model.) 5 Sheets—Sheet 1.

WITNESSES:

INVENTOR
George R. Sherwood.
BY
ATTORNEYS

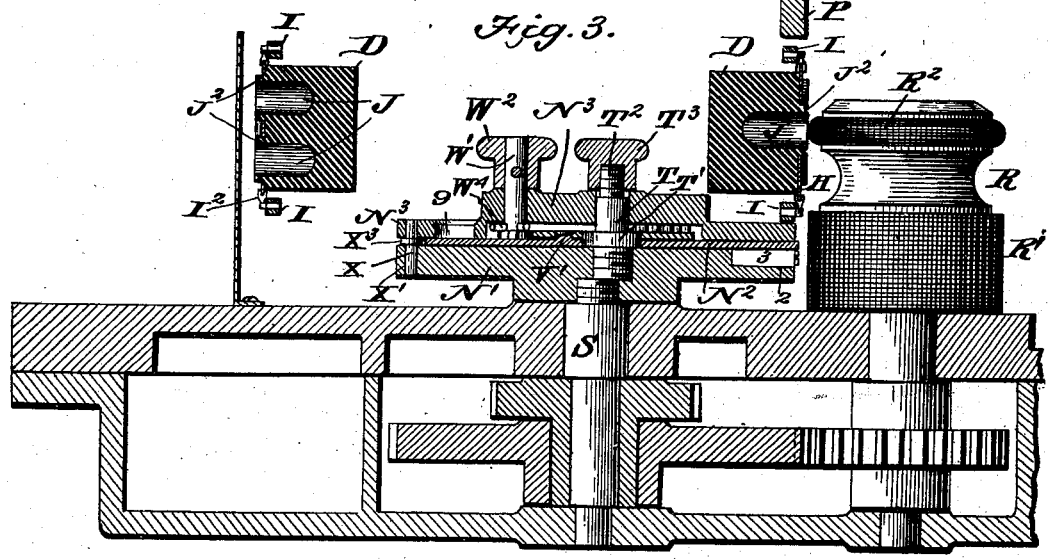
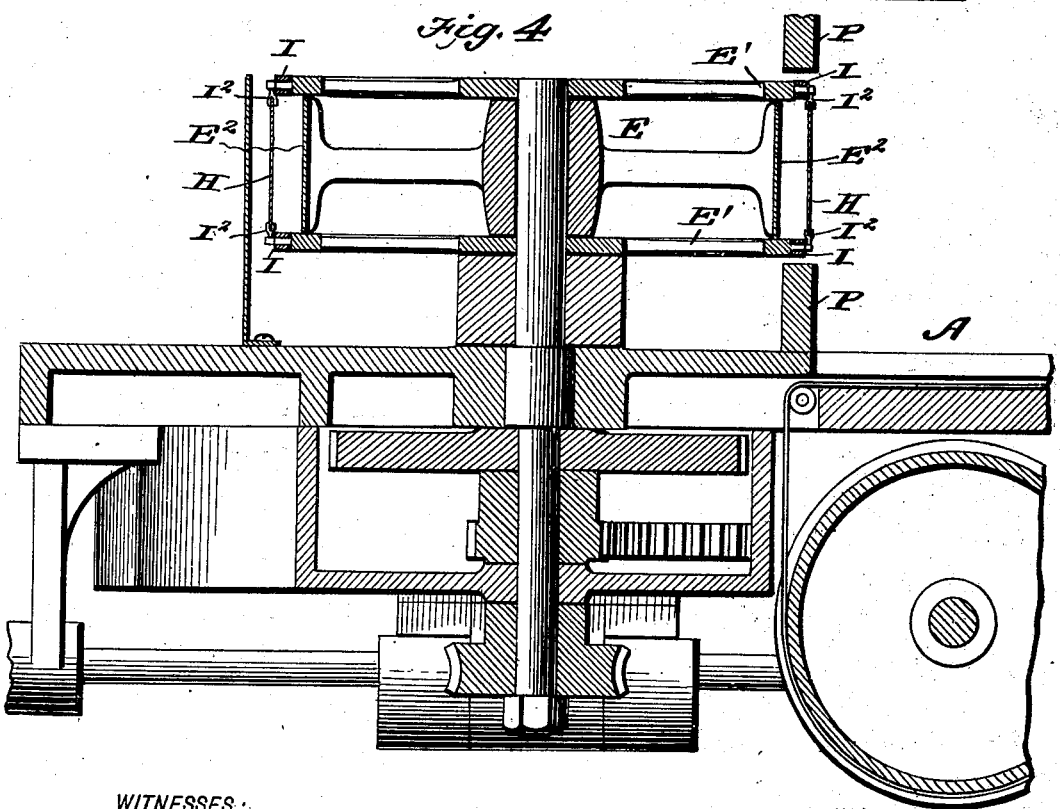

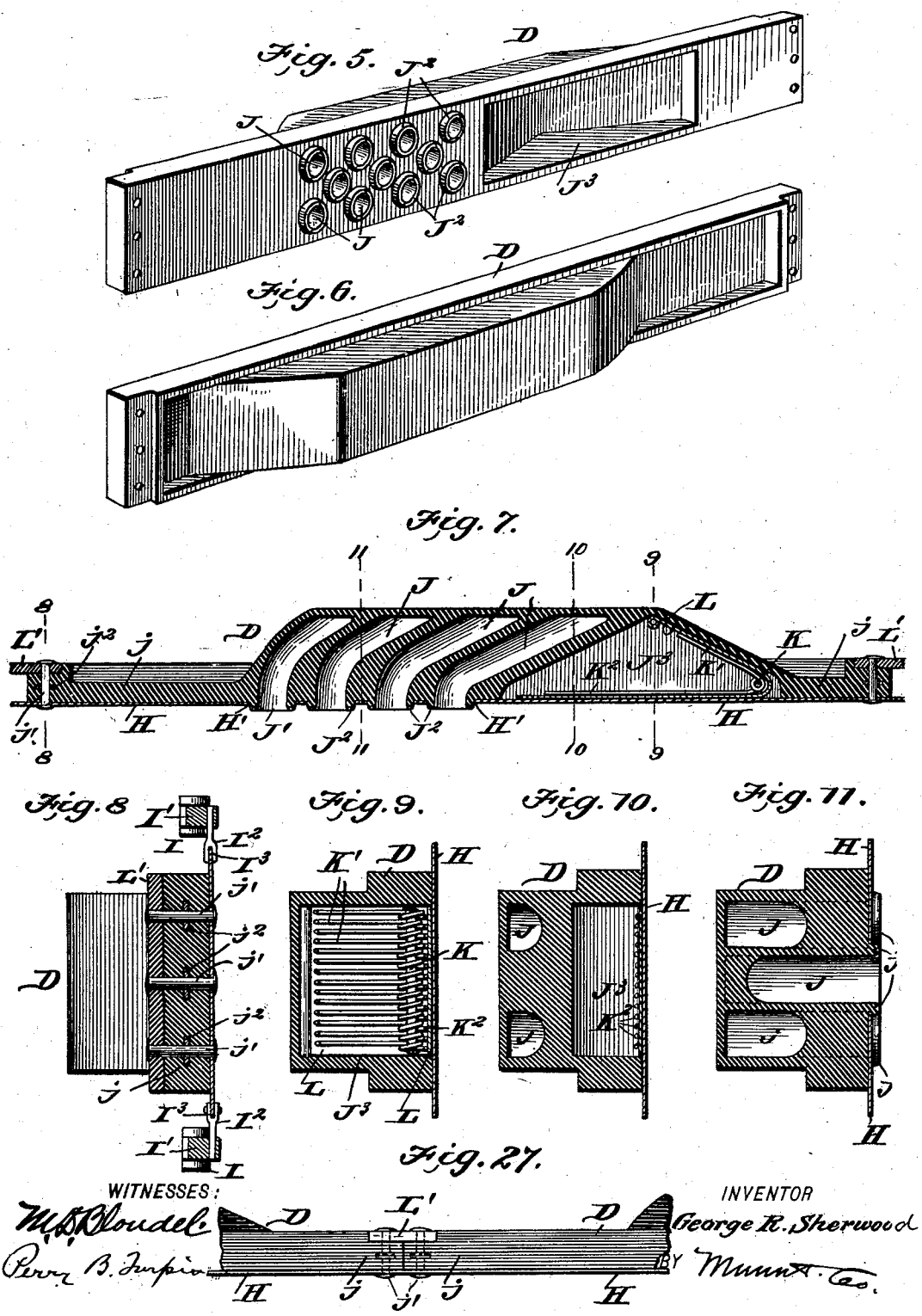

No. 702,494. Patented June 17, 1902.
G. R. SHERWOOD.
STAMP CANCELING MACHINE.
(Application filed July 24, 1900.)
(No Model.) 5 Sheets—Sheet 4.

WITNESSES: INVENTOR
George R. Sherwood
BY
ATTORNEYS

No. 702,494. Patented June 17, 1902.
G. R. SHERWOOD.
STAMP CANCELING MACHINE.
(Application filed July 24, 1900.)
(No Model.) 5 Sheets—Sheet 5.
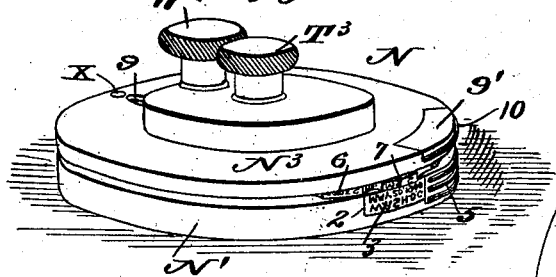
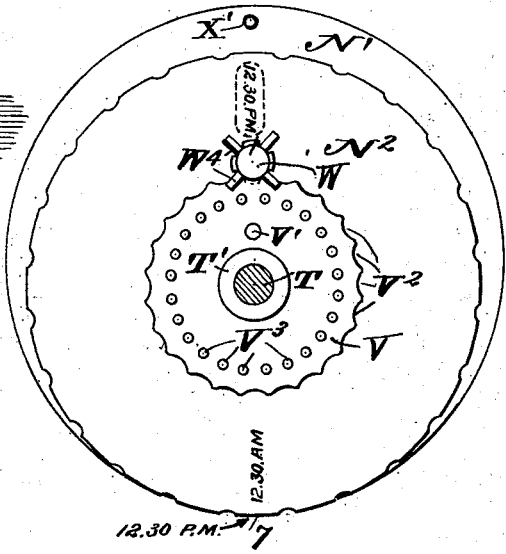
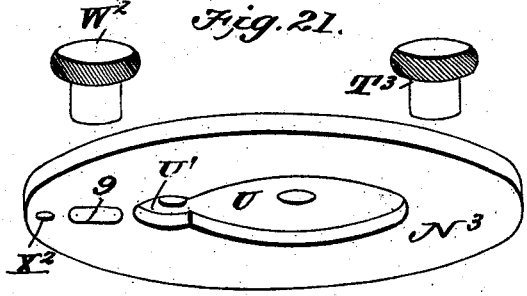
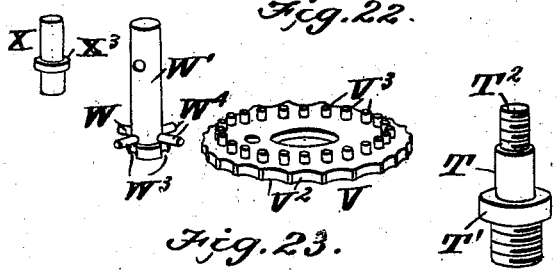
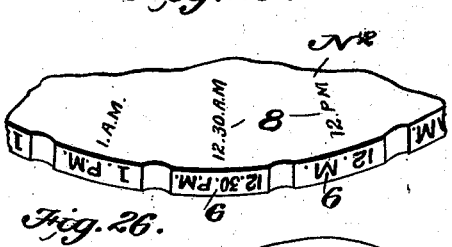
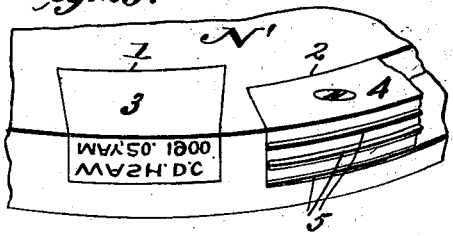
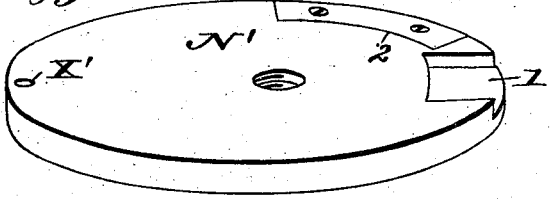
WITNESSES:
M. B. Blondel
Perry B. Turpin
INVENTOR
George R. Sherwood.
BY Munn & Co.
ATTORNEYS
THE NORRIS PETERS CO., PHOTO-LITHO., WASHINGTON, D. C.

UNITED STATES PATENT OFFICE.

GEORGE ROBINSON SHERWOOD, OF KEARNEY, NEBRASKA.

STAMP-CANCELING MACHINE.

SPECIFICATION forming part of Letters Patent No. 702,494, dated June 17, 1902.

Application filed July 24, 1900. Serial No. 24,637. (No model.)

*To all whom it may concern:*

Be it known that I, GEORGE ROBINSON SHERWOOD, residing at Kearney, in the county of Buffalo and State of Nebraska, have invented a new and useful Improvement in Stamp-Canceling Machines, of which the following is a specification.

My invention is a stamp-canceling machine embodying a carrier and a holder thereon arranged to secure the letter by the action of atmospheric pressure and convey the same to and past the canceling devices; and the invention consists in certain novel constructions and combinations of parts, as will be hereinafter described and claimed.

Figure 1:
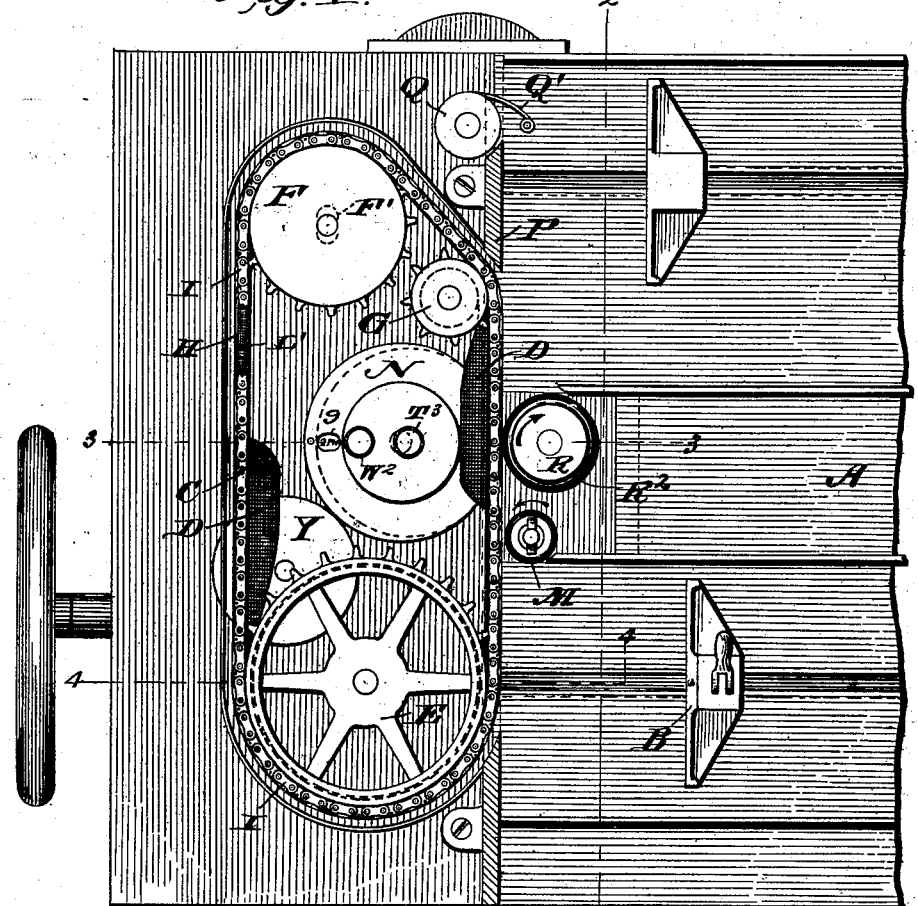
Figure 2:
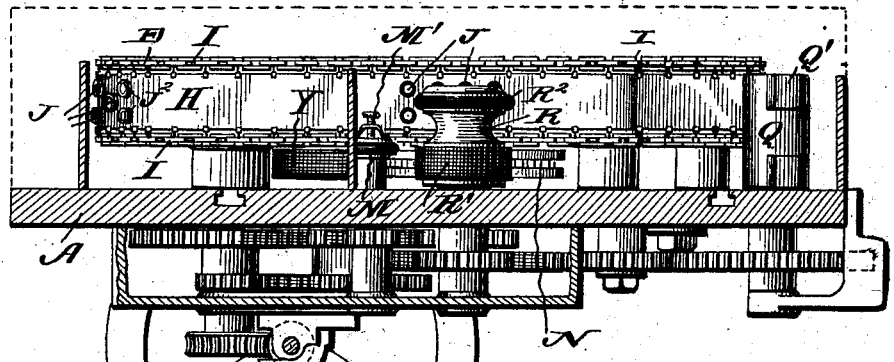
Figure 72:
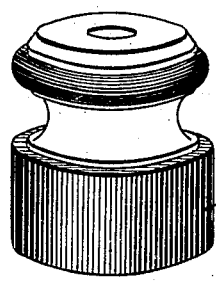
Figure 73:
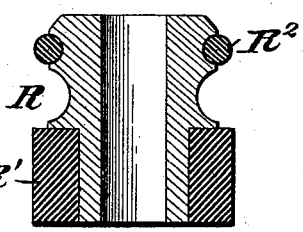
Figures 74, 75:
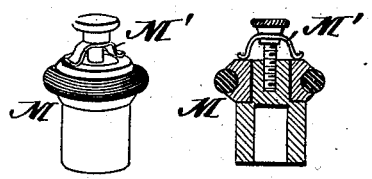
Figure 77:
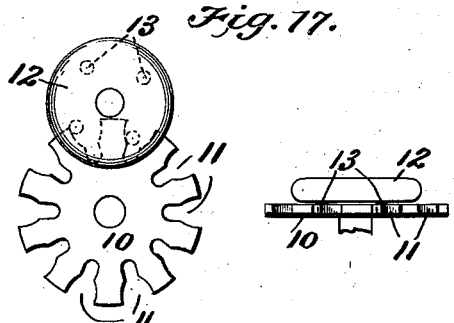
Figure 76:
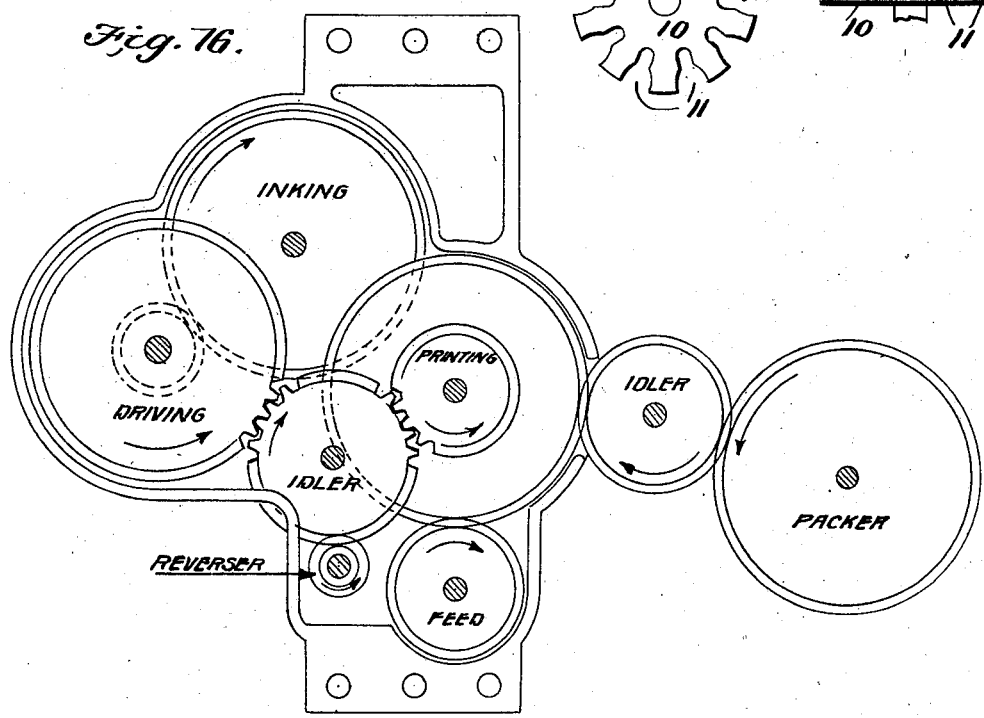
Figure 78:
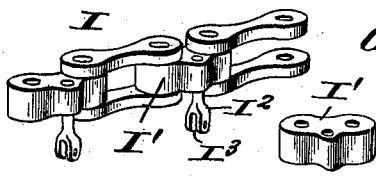

In the drawings, Figure 1 is a top plan view of a machine embodying my invention. Fig. 2 is a cross-sectional view on about line 2 2 of Fig. 1. Figs. 3 and 4 are detail vertical sections on about lines 3 3 and 4 4 of Fig. 1. Figs. 5 and 6 are detail perspective views of the compressible holder from the opposite sides thereof. Fig. 7 is a longitudinal section of the holder applied to the carrier plate or band. Figs. 8, 9, 10, and 11 are detail cross-sectional views on respectively lines 8 8, 9 9, 10 10, and 11 11 of Fig. 7. Fig. 12 is a perspective view, and Fig. 13 a sectional view, of the pulley having a drum opposing the canceling-wheel and a feeding-pulley for aiding in feeding the letters being canceled. Figs. 14 and 15 are respectively perspective and sectional views of the separating-pulley. Fig. 16 illustrates in diagrammatic form the gearing of the machine. Fig. 17 illustrates a somewhat-modified form of the devices for turning the time-disk of the canceling-wheel. Fig. 18 illustrates in perspective a section of the sprocket-chain forming a part of the feed mechanism. Fig. 19 is a perspective view of the canceling-wheel. Fig. 20 is a top plan view thereof, the cap-disk being removed and parts being shown in section. Fig. 21 is a perspective view of the cap-disk and the knobs operating above the same. Fig. 22 illustrates in perspective the pin which connects the main and cap disks, the wheel applied to the time-disk, the pinion meshing with said wheel or gear, and the pivot-stud for the time-wheel.
Fig. 23 is a detail perspective view of the time-disk. Fig. 24 is a detail perspective view of the main disk. Fig. 25 is a detail perspective view of a portion of the edge of the time-disk. Fig. 26 is a detail perspective view of a portion of the edge of the main disk, and Fig. 27 is a detail plan view showing the connections between the adjacent holders.

In carrying out my invention I employ a suitable frame having a table A, upon which the letters properly assorted are held by a slide B in position for operation by the feeding mechanism, presently described.

The feeding mechanism includes an endless carrier C, which is provided with a holder or holders D, preferably arranged to succeed each other, as shown. The carrier is driven by the wheel E and passes around the guide-pulley or tightener F and the idler G, as shown in Fig. 1. The carrier C, as shown, consists of the band or plate H, preferably of sheet metal, and the upper and lower sprocket-chains I, as shown in Figs. 2, 3, 4, and 8. The holders D are compressible, being preferably formed of india-rubber, and have a chamber or chambers J for air. These chambers J have open mouths J', which are preferably surrounded by projecting beads or nipples $J^2$, as shown in Figs. 5, 7, and 11. The holder D is also provided with a recess $J^3$, in which operate the spring devices which aid the resilience of the holder in opening or expanding the same to release the letter. By preference I provide a plurality of air-chambers J and arrange them in longitudinal and laterally-disposed series, as shown in Fig. 5, so a number of the air-chambers will operate upon the same letter, and thus not only insure the proper holding of the letter, but also prevent any twisting or displacement of the letter, as it will be held throughout practically its entire area by the several air-chambers, as will be more fully described hereinafter. The band or plate H is provided with a series of openings, and the holders D are arranged on the inner side of the plate H, with the nipples $J^2$ projecting through the openings H' in the band H and protruding beyond the outer side of said band, forming yielding circular beads or nipples to properly operate upon the letters to be fed to the canceling devices. The recess $J^3$ also opens next to the band H, and the spring devices are preferably in the form of spring-wires coiled at K and having arms K' and K² projecting from the coils K and operating within a metal band or plate L, fitted in the recess J³ and having one wing bearing against the base of said recess and its other wing bearing against the band or plate H, as best shown in Fig. 7.

At its ends the holder D is provided with strap-like portions $j$, which are secured to the band or plate H by means of rivets $j'$, which pass through washers $j^2$, embedded in the straps $j$. The band or plate H thus operates to connect the holders D at their outer faces, and the inner face, of the adjacent ends of the succeeding holders D are connected together by means of connecting-bars L', which are secured to the holders by the rivets $j'$, as shown in Fig. 7. At its upper and lower edges the band or plate H is provided with the sprocket-chains I, the links I' of which preferably support the projecting clasps I², which are bifurcated at I³, so they can clasp the band and be secured thereto by suitable rivets, as will be understood from Figs. 2, 8, and 18. The sprocket-chains I mesh with the sprocket-wheels E' at the upper and lower edges of the wheel E, while the holders D press against a drum-like portion E², which is located between the sprocket-wheels E' and operates to compress the holders D and so empty their chambers J of air. It will be noticed that the holders are compressed at a point directly opposite the slide B, so that as the holder passes from the wheel E toward the canceling devices, presently described, the letter of the pile which lies next to the open mouths of the chambers J will be pressed by atmospheric pressure firmly against such mouths, so the holder will operate to feed such letter toward the canceling devices. If a second or third letter should adhere to that which is positively held by the holder D, it will be forced back by the pulley M, which turns in the direction indicated by the arrow in Fig. 1 and is constructed, as shown in Fig. 2, with a tension device M', so it can be set to operate with more or less force upon the letters it is desired to return or separate from that which is being positively carried by the holder D. After the holder D passes the canceling devices N it will be compressed by the idler-roll G to empty its chambers J, and so release the letter the stamp of which has been canceled, and the letter will pass by a guide-board P and be discharged by a wheel Q, having a wing Q' to throw the letter out of the machine.

The canceling devices are arranged within the carrier, as shown in Fig. 1, and operate alongside the lower edge thereof, as shown in Fig. 2, and are also located between the wheel E, which compresses the holder to enable atmospheric pressure to operate to press the letter tightly against such holder, and the device G, which compresses the holder to cause it to release the letter. Opposite the canceling devices I provide a pulley R, having a drum R' opposing the canceling-wheel and a feeding pulley or surface R² opposite the carrier of the feeding device, so such pulley R will form a bed for the canceling devices and a means for aiding the passage of the letter through the machine. The pulley F guides the belt or carrier between the parts E and G and is preferably adjustable by fitting its supporting-shaft in a slot F', as shown in Fig. 1, so it can be set to take up any slack in the carrier.

The canceling-wheel N is shown in detail in Figs. 19 to 26, inclusive, in plan view in Fig. 1, in edge view in Fig. 2, and in cross-section in Fig. 3, and is composed of the base or main disk N', the time-disk N², and the cap-disk N³. The main disk N' is carried by the shaft S and is provided at its periphery with recesses 1 and 2, in which are secured blocks 3 and 4, the latter having the canceling-band 5 and the former being provided with type to indicate the post-office and date. Eccentrically upon the base-disk N' is mounted the disk N², which has on its periphery type arranged successively to indicate the hour and half-hour, as shown at 6 in Fig. 25. In supporting the time-disk N², I employ a stud-shaft T, which is threaded eccentrically in the disk N', has a circular collar or flange T' on which the time-disk N² turns, and is provided at its upper end with a threaded stem T², which projects above the cap-disk N³ and receives the nut T³, which may be tightened to clamp the base-disk, the time-disk, and the cap-disk firmly together, as will be understood from Fig. 3. By arranging the time-disk N² eccentrically to the base-disk it will be noticed, as best shown in Fig. 20, that only a portion of the rim of the time-disk will coincide with the periphery of the main disk N', as shown at 7 in Fig. 20, the remainder of the disk N² lying within the edge of the disk N', as shown in Fig. 20. I also provide means for turning the time-disk N² to bring any portion thereof to expose at its edge its printing-type 6 to cooperate with the printing devices 3 and 4 on the disk N'. To this end I provide in the under side of the cap-disk N³ a central circular main recess U and a smaller circular recess U', lateral to and communicating with the recess U, as shown in Fig. 21. In the recess U, I fit a gear-wheel V, (shown in Fig. 22,) which is made fast to the time-disk N² by means of a pin V', as shown in Fig. 23. The gear V is notched in its edge at V² and is provided on its face with projecting pins V³. In the recess U', I fit the wheel W, having its shaft W' projecting through and above the cap-section N³ and receiving the knob W². The wheel W is notched at W³ to mesh with the notched rim V² of the wheel V and has lateral pins W⁴, which mesh with the pins V³ of the wheel V. Thus by turning the knob W² the wheel V, and through it the time-disk, may be turned to bring any desired one of its printing-sections 6 into coincidence with the printing-sections of the main disk. When this is accomplished, it will be understood from Fig. 19 that only the printing-section 6 of the time-disk which is brought into coincidence with the printing-sections of the main disk will be exposed to print upon the letter which is passing through the machine. Upon the face of the time-disk I provide indicating characters at 8 corresponding to the type 6 at diametrically opposite points, and these indicating characters 8 are exposed through a slot 9 in the cap-disk N³, so the operator can determine at a glance which of the printing-sections 6 is adjusted to printing position. A pin X fits in openings X' and X² in the base and cap disks and is shouldered at X³ between said disks and operates to lock the base and cap disks together, so they will turn in unison. The cap-disk N³ is preferably provided at 10 with canceling-bands coinciding with the bands 5 of the base-section N', as is best shown in Fig. 19. An inking-roller Y is provided to apply ink to the canceling-wheel N.

In practice I prefer to provide four of the holders D on the endless band or plate and to so time the movement of the carrier and of the canceling-wheel that the printing characters of the canceling-wheel will be brought into play opposite the pulley R at the instant each of the holders is brought opposite said pulley. This is accomplished by suitable gearing, which may be that shown or of other suitable construction, as desired, and which it is not thought necessary to describe in detail herein.

In Fig. 17 I show a modified construction of the wheels V and W. In this modified construction a wheel 10 has its periphery notched at 11, and the knob 12 is provided on its under side with pins 13, which operate in the notches 11 to turn the wheel 10, as will be understood from the said Fig. 17.

Having thus described my invention, what I claim, and desire to secure by Letters Patent, is—

1. In a stamp-canceling machine, a feeding mechanism comprising a compressible holder provided with a plurality of air-chambers each having an open mouth, the several mouths opening within the area of the letter to be fed, a carrier for said holder, means by which the holder may be compressed to discharge the air from its chambers whereby it will when expanded, operate to hold by atmospheric pressure a letter fed against its open mouths, and means for compressing the holder to cause it to release the letter so held substantially as set forth.

2. A stamp-canceling machine provided with a letter-feeding mechanism comprising a carrier composed of front and rear band-wheels, an endless feeding-band thereon, and a suction-holder secured thereto, and means for operating said holder whereby it is caused to secure and release the letter, and guides whereby the letter-holder is directed in a straight line between the point where it receives the letter and the canceling device, substantially as set forth.

3. In a stamp-canceling machine, the combination of the front and rear band-wheels, the endless feeding-band, and a compressible holder carried by the band and having a plurality of independent chambers with their mouths opening independently whereby the holder will operate to secure the letter at different points, substantially as set forth.

4. In a stamp-canceling machine, a compressible holder provided with an air-chamber having an open mouth and having adjacent to said mouth a flat face to fit against the letter and a projecting bead or nipple surrounding said mouth, substantially as set forth.

5. A stamp-canceling machine comprising a carrier and a compressible holder provided with a plurality of independent chambers having open mouths arranged in longitudinal and lateral series, substantially as set forth.

6. In a stamp-canceling machine, the combination of a compressible holder provided with an air-chamber having an open mouth against which the letter may be held by atmospheric pressure, and with a spring-holding chamber with a spring operating in said chamber by which to expand the holder to open the air-chamber, and a double-winged plate receiving said spring, substantially as set forth.

7. In a stamp-canceling machine, a compressible holder of resilient material provided with an air-chamber having an open mouth and with a spring-holding chamber and a series of independent springs operating in such chamber by which to expand said holder, substantially as set forth.

8. In a stamp-canceling machine, the combination of a compressible holder provided with an air-chamber having an open mouth and with a recess, and a spring in said recess to open or expand the holder, substantially as set forth.

9. In a stamp-canceling machine, a letter-feeding mechanism comprising a carrying-band, and a compressible holder carried thereby and provided with an air-chamber projecting beyond the rear face of the band and having an open mouth at the front or outer side of the band, substantially as set forth.

10. In a stamp-canceling machine, a letter-feeding mechanism comprising a carrying band or plate having a plurality of openings, and an expansible holder having a plurality of air-chambers whose mouths are open and are surrounded by projecting nipples, said holder being secured on one side of the band or plate with its nipples projecting through the openings thereof and protruding beyond the opposite side of the band or plate, substantially as set forth.

11. In a stamp-canceling machine, a letter-feeding mechanism, comprising the carrier band or plate having an opening for the nipple of the air-chamber of the holder, the compressible holder provided with the nipple fitted in said opening and secured at one face to the band or belt and having in said face an air-chamber whose mouth coincides with the opening in said band and also having in said face a recess for the expanding-spring, and the expanding-spring fitted in said recess and operating between the band or plate and the holder to open or expand the holder, substantially as set forth.

12. In a stamp-canceling machine, a letter-feeding mechanism comprising the endless carrier, the compressible letter-holder carried thereby and provided with an air-chamber projecting normally from the rear face of the band and having an open mouth, and the driving and supporting pulleys around which said carrier is passed and arranged to operate upon the air-chambers substantially as set forth.

13. In a stamp-canceling machine, the letter-feeding mechanism comprising the drive-pulley having the drum portion and the sprocket-wheels above and below the same, the carrier band or belt, the compressible holder thereon having an air-chamber and the guide-pulleys coöperating with the drive-pulley in supporting the carrier, substantially as set forth.

14. In a stamp-canceling machine the combination of the pulleys supporting the carrier, the carrier having a band or plate passed around said pulleys, and the compressible holders secured to the inner side of said band or plate, substantially as set forth.

15. In a stamp-canceling machine, the combination of the letter-feeding mechanism consisting of an endless carrier having compressible letter-holding devices and guides for directing said carrier and for compressing the holding devices, and the canceling devices operating alongside one edge of the said carrier, substantially as set forth.

16. In a stamp-canceling machine, the combination of the canceling devices, a carrier movable past said canceling devices and provided with a compressible holder provided with a series of independent chambers whose mouths open within the area of the letter to be fed and arranged to secure the letter by the action of atmospheric pressure and means in advance and rear of the canceling devices by which to compress the holder whereby to provide for securing the letter by atmospheric pressure in advance of the canceling devices and for releasing it in rear of such devices, substantially as set forth.

17. In a stamp-canceling machine, the combination of a base-disk having on its periphery one portion of the cancellation device and one or more lines of characters designating the postal station, a crown-disk concentric with and connected with the base-disk, an eccentrically-located stud, an intermediate disk rotatable on said stud and having on its periphery a series of characters representing the usual subdivisions of a day and so positioned that at all times one of the said series shall extend outwardly and register with the line or lines of characters on the base, a locking-plate having in its periphery a series of cavities and on its upper side a series of pins, the said cavities and pins being of the same number as the subdivisions of the intermediate disk, a pin for securing the locking-plate to the intermediate disk, and a stud rotatable in the crown-disk and having cross-arms adapted to mesh with and transmit motion to the pins of the locking-plate and also having a portion adapted to engage with the peripheral concavities of the said locking-plate and hold the same except at such times as the said arms and pins are in operative contact substantially as shown and described.

18. In a stamp-canceling machine, the canceling and dating wheel comprising the base-disk, the cap-disk fitted on and held to the base-disk, the time-disk between and eccentric to the base and cap disks and provided with a wheel having peripheral notches and pins or spurs projecting from its face, and the pinion having a wheel notched to mesh with the said peripheral notches and having lateral pins to mesh with the face-pins of the said wheel substantially as set forth.

19. In a stamp-canceling machine, the canceling-wheel comprising the base-disk, the cap-disk concentric with and secured to the base-disk, provided in its inner face with a central, main circular recess and with a circular recess lateral to and communicating with the main recess, the time-disk between and eccentric to the base and cap disks, the wheel held to said time-disk and fitted in the main recess of the cap-disk and the shaft journaled in the cap-disk and provided with a wheel fitted in the lateral recess in the cap-disk and meshed with the wheel in the main recess, substantially as set forth.

20. In a stamp-canceling machine the canceling-wheel comprising the base-disk, the cap-disk, the time-disk between the base and cap disks, the pin extended between the base and cap disks and the screw devices for clamping the base and cap disks together and upon the time-disk, substantially as set forth.

21. In a stamp-canceling machine, the combination of a canceling-wheel, a letter-feeding device having an endless carrier movable in an uninterrupted straight line past the face of the canceling-wheel adjacent to the periphery thereof and provided with a plurality of letter-holding devices, a letter-guide normally impinging the face of the carrier, opposite and above the cancellation-wheel, and a positively-driven resilient drum inflexibly mounted opposite the said cancellation-wheel.

22. A stamp-canceling machine provided with a letter-feeding mechanism comprising an endless carrier-band and a holder thereon arranged to secure the letter by the action of atmospheric pressure, means for expanding and contracting said holder whereby it is caused to secure and release the letter, and guides whereby the letter-holder is directed in a straight line between the point where it receives the letter and the canceling device.

23. A stamp-canceling machine comprising a letter-feeding mechanism composed of an endless carrier-band, a suction-holder secured thereto, supporting and operating devices for the carrier, and means for positively expanding and contracting the suction-holder substantially as set forth.

24. In a stamp-canceling machine, the combination of a compressible suction-holder, an endless carrier to which said holder is secured, means carried by the holder by which it may be expanded and means independent of the holder for compressing the same substantially as set forth.

GEORGE ROBINSON SHERWOOD.

Witnesses:
E. C. CALKINS,
MAUD MARSTON.